United States Patent [19]
Wenger et al.

[11] Patent Number: 4,763,569
[45] Date of Patent: Aug. 16, 1988

[54] LOW TEMPERATURE EXTRUSION PROCESS FOR QUICK COOKING PASTA PRODUCTS

[75] Inventors: Marc L. Wenger; Gordon R. Huber, both of Sabetha, Kans.

[73] Assignee: Wenger Manufacturing, Inc., Sabetha, Kans.

[21] Appl. No.: 111,196

[22] Filed: Oct. 22, 1987

Related U.S. Application Data

[62] Division of Ser. No. 930,155, Nov. 12, 1986.

[51] Int. Cl.$^4$ .............................................. A23L 1/16
[52] U.S. Cl. ...................................... 99/348; 366/75; 426/451
[58] Field of Search ........................ 99/348, 483, 485; 366/75, 76, 77, 83; 425/207, 208; 426/443, 447, 451

[56] References Cited

U.S. PATENT DOCUMENTS

| | | | |
|---|---|---|---|
| 2,629,662 | 2/1953 | Julian et al. | 99/15 |
| 3,117,006 | 1/1964 | Wenger | 99/80 |
| 3,162,536 | 12/1964 | Kaufmann | 99/85 |
| 3,450,592 | 9/1985 | Myer et al. | 426/557 |
| 3,458,321 | 7/1969 | Reinhart et al. | 99/80 |
| 3,563,514 | 4/1971 | Shattuck | 366/75 |
| 3,579,352 | 5/1971 | Bookwalter et al. | 99/78 |
| 3,846,563 | 11/1974 | Cunningham | 426/158 |
| 3,861,287 | 1/1975 | Manser | 99/348 |
| 3,985,348 | 10/1976 | Skidmore | 366/75 |
| 4,044,165 | 8/1977 | Baumann | 426/557 |
| 4,312,265 | 1/1982 | Enterline | 99/348 |
| 4,383,764 | 5/1983 | Sloin | 366/75 |
| 4,394,397 | 7/1983 | Lometillo et al. | 426/557 |
| 4,423,082 | 12/1983 | Bauernfeind et al. | 426/557 |
| 4,440,794 | 4/1984 | Davies | 426/578 |
| 4,474,473 | 10/1984 | Higuchi et al. | 366/75 |
| 4,500,558 | 2/1985 | Fulger et al. | 426/622 |
| 4,521,436 | 6/1985 | Lou et al. | 426/549 |
| 4,528,202 | 7/1985 | Wang et al. | 426/550 |
| 4,539,214 | 9/1985 | Winter et al. | 426/557 |

FOREIGN PATENT DOCUMENTS 1538067 7/1968 France.

Primary Examiner—Robert W. Jenkins
Attorney, Agent, or Firm—Hovey, Williams, Timmons & Collins

[57] ABSTRACT

Quick cooking pasta products are extruded in a low temperature process by advancing a partially precooked mixture of pasta flour and water prepared in a preconditioner along the length of a screw extruder through a cooking zone, then through a venting zone and a forming zone, and finally through an extrusion die to yield an extruded product. The mixture has a maximum temperature of 215° F. in the cooking zone in order to substantially eliminate the formation of darkened specks in the final extruded product which would otherwise represent portions of the mixture that are burned during cooking. Limiting the maximum temperature of the mixture in the extruder also greatly enhances the extruded pasta quality by increasing product resistance to overcooking and improving the retention characteristics of the original product integrity. Venting of the gaseous products from the mixture during the time that the latter passes between the cooking zone and the forming zones removes significant amounts of moisture to enable less shear to be imposed on the mixture during the cooking process and to decrease the time required for rehydration of the extruded products. A venting device has a rotatable screw for enabling gaseous materials to be discharged from the mixture while substantially preventing the escape of the mixture from the extruder barrel.

5 Claims, 1 Drawing Sheet

LOW TEMPERATURE EXTRUSION PROCESS FOR QUICK COOKING PASTA PRODUCTS

This is a division of application Ser. No. 930,155, filed on Nov. 12, 1986.

BACKGROUND OF THE INVENTION

1. Field of the Invention

The present invention relates to a method for continuous manufacture of pasta products which may be readily rehydrated by immersion of the products in boiling or hot water for 1.5 to 5 minutes. The method includes the use of a preconditioner to partially pre-cook a flour and water mixture, and also includes the use of an extruder wherein the flour and water mixture is advanced first through a low temperature cooking zone, then through a venting zone and a forming zone, and finally through an extrusion die to yield the products. A significant amount of moisture is removed from the mixture in the venting zone thereby enabling use of greater amounts of direct injection steam into the mixture in the cooking zone without imparting excess shear into the pasta product which results in poor product integrity or adversely raising the temperature of the mixture to a value which would otherwise cause portions of the mixture to burn and form darkened specks in the extruded product.

2. Description of the Prior Art

Conventional pasta products are typically manufactured by uniformly combining water and flour such as Semolina and thereafter subjecting the flour and water mixture to extrusion under pressure through a die to shape the mixture into products of the desired shape, such as macaroni or spaghetti. However, conventional pasta products must be cooked for approximately 10 to 15 minutes in boiling water in order to hydrate and gelatinize the starch and transform the extruded product into an edible state.

In recent years, increased attention has been directed toward quick cooking pasta products which can be conveniently rehydrated in 3 to 5 minutes in boiling water. These products may also be mixed with other foods and cooked in a microwave or conventional oven without the need for precooking the products on a stove and thereafter draining the excess water.

U.S. Pat. Nos. 3,615,667, 4,230,735, 4,243,690, 4,423,082, 4,044,165 and 4,540,592 exemplify efforts which have been made in the past to improve the storage, cooking and visual characteristics of extruded, quick cooking pasta products. Attempts have also been made to decrease stickiness of the products, inhibit the formation of a slimy surface on the cooked product, and increase the integrity of the product with, of course, a minimum of manufacturing time and expense including overall energy costs during the extrusion process.

One particular problem which has been observed to occur during certain types of processes for extruding quick cooking pasta products has been the formation of black or darkened specks in the final manufactured product which decrease consumer acceptability and which may influence the taste of the product after rehydration. In this regard, it has been found that the darkened specks normally represent portions of the flour and water mixture which have temporarily adhered to the extruder screw flighting and have been burned as a result of the relatively high temperatures encountered during conventional, quick cooking pasta extruder processes. Such burned portions subsequently disengage the screw and are discharged through the die opening along with the remaining unburned portions of the mixture to thereby cause the dark specks in the final product which can be readily observed by simple visual inspection.

Furthermore, many of the known processes for manufacturing quick cooking pasta impose excessive amounts of shear on the flour and water mixture during advancement of the mixture through the extruder. Unfortunately, excessive shear of the flour and water mixture causes the final product to have a slimy surface and also decreases product integrity which is measured by the ability of the product to spring back to its original shape after rehydration. Moreover, excessive shear leads to increased extruder energy consumption and mechanical problems such as increased wear on the extruder components.

Hence, it would be desirable to provide a process for manufacturing quick cooking pasta at reduced temperatures in order to avoid formation of burned, darkened specks in the final product while, at the same time, the flour and water mixture are exposed to a minimum of mechanical shear during the extrusion process. Advantageously, such a process would overcome problems caused by practice of known methods such as formation of air bubbles in the extruded products and decreased product tolerance to overcooking. Desirably, the process would enable use of relatively high amounts of moisture during extrusion while reliably insuring that the extruded product is completely cooked before advancing toward a drying station where the products are dried during relatively short periods of time with air at ambient temperatures or temperatures somewhat above ambient.

SUMMARY OF THE INVENTION

The present invention overcomes the disadvantages noted hereinabove by provision of a low temperature extrusion process for production of quick cooking pasta products which includes passing a pasta flour and water mixture through a preconditioner for 20 seconds to three minutes to partially pre-cook the mixture at temperatures in the range of 150° F. to 210° F. The mixture is then introduced into an extruder for passage first through a cooking zone, then through a venting zone and a forming zone, and finally through an extrusion die to yield an extruded product. The mixture is treated to have a maximum temperature of about 215° F., and preferably a maximum temperature of about 205° F. in order to substantially eliminate a possibility that darkened, burned specks will appear in the extruded product. However, if desired appreciably lower temperature maximums can also be used, e.g., no higher than about 185° F. Pressures within the barrel of the extruder are in the range of 200 psig to 1200 psig.

Importantly, the venting zone provided in the extruder in accordance with the invention causes significant amounts of moisture in the form of gaseous products to be removed from the flour and water mixture before passage of the mixture to the forming zone and to the die. As a consequence, the ratio of water to flour in the mixture during advancement through the cooking zone can be increased which lowers the viscosity of the mixture and thereby causes correspondingly less shear to be imposed upon the same. The extruded product produced exhibits superior integrity after rehydration with a noticeable absence of a slimy feel and appearance of the product surface; moreover, the product has a substantial tolerance to overcooking without measurable detraction from desirable organoleptic properties.

Exposure of the flour and water mixture to the venting zone and the extruder advantageously cools the mixture before entering the forming zone and the die. As such, the extruded product is substantially easier to handle before arriving at the drying station because the product retains its shape and can be severed with a clean cut by a knife held to the face of the die without tearing of the pasta. Additionally, forming the mixture at cooler temperatures deceases the stickiness and air bubble content of the product which reduces the likelihood that the extruded products will clump together and be rendered unsaleable.

It has been found that application of negative pressures to the venting zone of the extruder decreases the time required for rehydration of the manufactured product by approximately one minute and substantially prevents formation of air bubbles in the extruded product in order to increase the transparency of the final product. Venting of the extruder also greatly reduces the moisture of the mixture to enhance the quality of the final product. In preferred forms of the invention, the venting zone is equipped with a device having a conical housing connected to a vent and an upright screw positioned in the housing, and the screw has flights for biasing any portion of the flour and water mixture entering the housing back toward the extruder in a direction opposite from the flow of the vented gases.

DETAILED DESCRIPTION OF THE DRAWING

Figure 1:
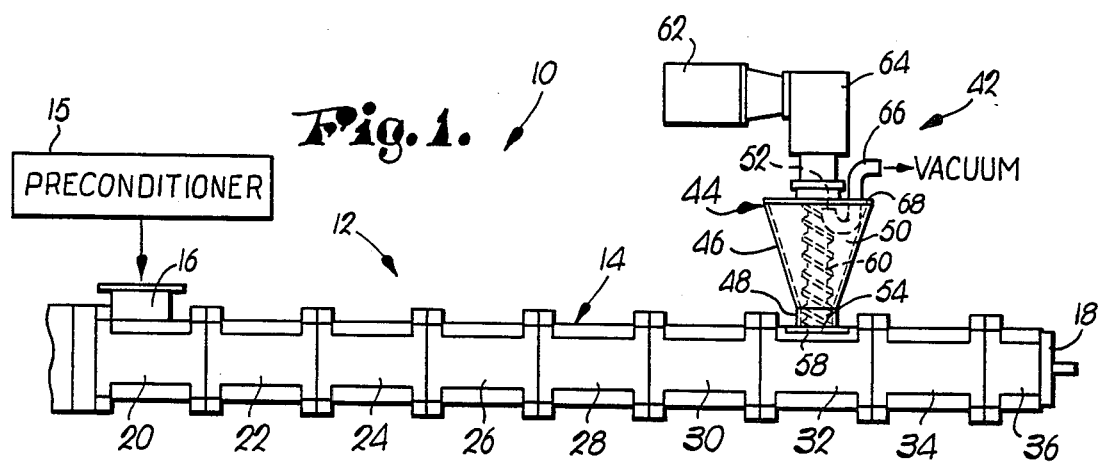
FIG. 1 is a fragmentary, side elevational view in somewhat schematic form illustrating an exemplary extruder used for cooking and extruding a flour and water mixture into quick cooking pasta products in accordance with the principles of our present invention.

Turning initially to FIG. 1, an extrusion apparatus 10 is shown and includes an extruder 12 having a barrel 14 with an inlet 16 located below an outlet of a preconditioner 15; the extruder 12 also has an outlet with a die 18. The barrel 14 as depicted comprises nine barrel sections 20–36, although the number of barrel sections may vary without departing from the principles of the present invention.

Figure 2:
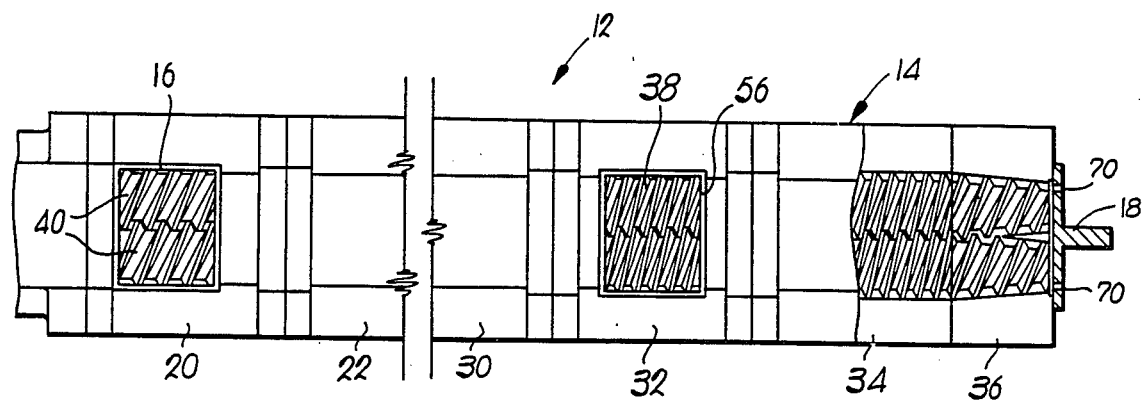
FIG. 2 is an enlarged, fragmentary, plan view of the extruder shown in FIG. 1 with parts broken away in section to reveal twin, flighted screws positioned within a barrel of the extruder.

As shown in FIG. 2, the extruder barrel 14 has walls defining a chamber 38 which is comprised of two frusto-cylindrical, juxtaposed, intercommunicated chamber sections. Two rotatable, flighted, material advancing screws 40 are received in respective sections of chamber 38 and are intermeshed along the majority of the length of the extruder barrel but diverge at the region of the final barrel section 36 and are received within respective, complemental, conical barrel sections in order to split the material being processed into two juxtaposed, noncommunicating streams.

The twin screw food extruder 12 as illustrated in FIG. 2 is manufactured by Wenger Manufacturing, Inc., the assignee of the present invention, and is designated as the Wenger TX Extruder depicted in Wenger Bulletin No. 56-586 which is hereby expressly incorporated into the disclosure herein. The Wenger TX Extruder is also described in U.S. Patent Application, Ser. No. 794,252, filed Oct. 30, 1985 (a continuation of Ser. No. 603,195, filed Apr. 23, 1984) which are also hereby expressly incorporated into the present disclosure. The Wenger TX Extruder has been found to provide relatively high pressure differentials in the twin head outlet sections, and on the order of 500 psi to 600 psi; this factor is believed to be at least partially significant in obtaining the unique results of the present invention.

Referring again to FIG. 1, a device 42 for venting barrel section 32 includes a housing 44 having a conically configured portion 46 and a cylindrical portion 48 that interconnects the conical portion 46 and the extruder barrel 14. The enclosed housing 44 has structure defining a passage 50 which has a conical configuration within portion 46 and a corresponding cylindrical configuration within portion 48. The passage 50 has an outlet 52 and an inlet 54 which is in communication with a vent opening 56 (see FIG. 2) in barrel section 32. Housing 44 also includes a lower, horizontal flat plate 58 which is received in leak-resistant contact in vent opening 56 and covers a substantial portion of the same except for a region immediately adjacent passage 50 within cylindrical portion 48.

The venting device 42 further includes a screw 60 having flights for biasing material entering the passage 50 through the vent opening 56 in an opposite direction toward the chamber 38 of barrel section 32. The upright venting device screw 60 is axially rotatable within passage 50, including areas adjacent passage inlet 54, and is powered by a motor 62 coupled to right angle drive 64.

The passage outlet 52 is provided by a pipe 66 which extends through a cover 68 of the venting device housing 44, and the pipe 66 is C-shaped within the housing 44 so that outlet 52 is directly adjacent cover 68. The pipe 66 is vented to the atmosphere, or preferably is coupled to a vacuum source for inducing a negative pressure within passage 50 and for drawing off gaseous products from material being advanced along extruder 12.

In accordance with the present invention, a low temperature extrusion process is provided for production of quick cooking pasta products, and includes the step of introducing a mixture comprised of pasta flour and water into the barrel 14 of extruder 12. The pasta flour and water mixture is initially prepared in the preconditioner 15 by mixing flour with water and elevating the temperature of the mixture to a level of from about 160° F. to about 210° F. for a residence time of 20 seconds to 3 minutes, although a residence time of 1 minute to 2 minutes is preferred. The preconditioning step also may optionally include the step of adding steam to the flour and water mixture during travel of the mixture along the first one-third of the length of the preconditioner 15.

Desirably, the mixture within the extruder chamber 38 ahead of venting barrel to section 32 comprises about 80 to 50% by weight of pasta flour and from about 20 to 50% by weight of water. Better results have been observed, however, when the mixture ahead of section 32 comprises from about 70 to 65% by weight of pasta flour and from about 30 to 35% by weight of water.

Once the pasta flour and water mixture is introduced into the extruder 12 through inlet 16, the mixture is advanced along the length of the barrel 14 by axial rotation of screws 40. The mixture is sequentially advanced first through a cooking zone in the extruder, then through a venting zone and a forming zone, and finally through holes 70 (FIG. 2) in die 18 to yield an extruded product.

Barrel sections 20-30 shown in FIGS. 1 and 2 for exemplary purposes represent the cooking zone. The flour and water mixture during advancement through the cooking zone has a maximum temperature of up to about 215° F., although preferably the maximum temperature is about 205° F. Also, the residence time of materials within the cooking zone including barrel sections 20-30 is within the range of about 10 seconds to about 25 seconds, and preferably is approximately 15 seconds.

Barrel section 32 represents the aforementioned venting zone wherein gaseous products are removed from the flour and water mixture as the latter is advanced by screws 40. As the gaseous products are discharged through vent opening 56 and passage 50, vent device screw 60 is rotated to bias any portion of the flour and water mixture that passes from the chamber 38 through vent opening 56 in an opposite direction back toward chamber 38. As can be appreciated by reference to FIG. 1, provision of the upright passage 50 in cooperation with the vertical screw 60 enables the influence of gravity to cause any portion of the mixture within passage 50 to fall toward the screw 60 which, in turn, then advances the same back toward chamber 38. If desired, a wiping element (not shown) may be positioned within the conical portion of passage 50 to scrape lodged portions of the flour and water mixture from the internal surface of housing conical portion 46.

Preferably, the outlet 52 of passage 50 communicates with a vacuum source which provides a vacuum from about 5 to 20 in. Hg. Better results have been observed, however, when the negative pressure within passage 50 is about 15 in. Hg.

The conical portion of passage 50 enables the face velocity of mixture entering the passage 50 to be reduced to a relatively low level as the mixture approaches cover 68 in order to substantially preclude entry of the mixture into vacuum pipe 66. Location of the vent outlet 52 at an upper corner of passage 50 adjacent cover 68 enables a relatively large quantity of the mixture to temporarily flow into passage 50 without danger of entering pipe 66. At the same time, the conical configuration of portion 46 causes mixture collected therein to fall downwardly toward the passage inlet 50 whereupon the positive rotation of screw 60 by motor 62 causes the same to be forced back into the barrel chamber 38.

Again referring to FIG. 1, barrel sections 34 and 36 represent for exemplary purposes the forming zone through which the flour and water mixture is advanced before being extruded through die holes 70. The residence time of the mixture in the forming zone is from about 20 seconds to about 60 seconds, and preferably is approximately 45 seconds. Additionally, the mixture is subjected to a pressure within the forming zone of from about 200 to about 1200 psig, and preferably the mixture in the forming zone is subjected to a pressure of from about 500 psig to about 600 psig.

Both water and steam may be injected into the mixture as the same is advanced along chamber 38. For example, tap water may be injected into the initial barrel section, or barrel section 20, with a temperature in the range of 50° F. to 65° F., and steam may be added downstream of barrel inlet 16 in regions corresponding to barrel sections 24, 26, 28. As another example, water having a temperature of about 180° F. may be injected into the initial barrel section 20, whereby less steam will be required. Other orientations, of course, are also possible.

The barrel 14 of extruder 12 advantageously is jacketed so that coolant water or oil can circulate in the extruder 12 adjacent chamber 38 for subjecting the flour and water mixture to indirect thermal interchange during advancement thereof along the length of barrel 14. Other expedients such as electrical resistance or induction heating could also be employed. Preferably, the mixture during travel through the entire length of extruder 12 has a temperature in the range from approximately 130° F. to approximately 210° F. subject, of course, to the maximum temperatures in the cooking zone as set forth hereinabove. Optionally, the temperature of the mixture in the forming zone is less than the temperature of the same in the cooking zone.

As the mixture is passed from the forming zone of extruder 12 and through the die holes to yield an extruded product, a knife (not shown) held under compression against the outside face of die 18 severs the extruded product to the desired length. Next, the products are advanced to a drying station in order to render the same suitable for storage and transport.

In preferred forms of the invention, the step of drying the extruded products is carried out until the pasta products have a moisture level of about 8% to 14% by weight. However, better results have been observed when the moisture level of the final pasta product is in the range of approximately 10% to approximately 12% by weight.

The extruded products during the drying stage are preferably subjected to a temperature of from about ambient, or about 75° F., to about 180° F. for a period of from about 20 minutes to about 60 minutes. Better results have been observed, however, when the extruded products during the drying step are subjected to a temperature of about 120° F. to about 140° F. for a period ranging from about 20 minutes to 30 minutes.

It has been found in accordance with the principles of the present invention that low temperature extrusion of quick cooking pasta products substantially eliminates the formation of darkened, burned specks of material while decreasing energy requirements. Also, air bubble content is reduced, over cooking tolerance is increased, and product flavor is enhanced. Lower temperatures during the cooking process, in combination with the cooling effect of the mixture provided by venting device 42, facilitates handling of the extruded product prior to the drying station by reducing stickiness of the product and by causing the same to better retain its shape.

Significant amounts of moisture are removed from the flour and water mixture during passage of the mixture through the venting zone in the extruder 12, and as such greater amounts of moisture may be present within the mixture during passage through the cooking zone, thereby reducing the amount of shear that would otherwise be imposed upon the same. Reducing the shear in the cooking zone increases product integrity after rehydration, thereby avoiding tendency of the product to collapse or fall apart once rendered to an edible state. Moreover, reducing the shear imposed on the mixture in the cooking zone avoids sliminess of the product and also decreases overall energy consumption of the extruder 12. The extruded product exhibits superior resistance to overcooking and consequently the quality of the product is superior to products produced by known methods.

Utilization of a vacuum greater than 5 in. Hg. in the venting zone reduces rehydration time by approximately 1 minute. That is, without venting, full rehydration normally occurs after 4 minutes, while the addition of the venting stage causes full rehydration after 3 minutes. The application of a vacuum at the venting zone also substantially prevents formation of air bubbles in the extruded product.

Figure 3:
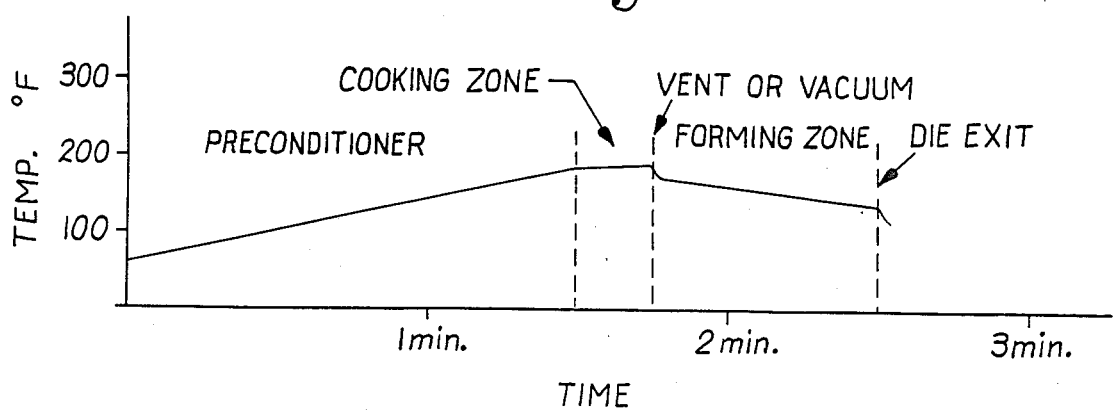
FIG. 3 is a typical temperature profile representing the temperature of a flour and water mixture during passage along the length of a preconditioner as well as the extruder shown in FIG. 1.

FIG. 3 represents for exemplary purposes a typical temperature profile of the mixture during advancement within the preconditioner 15 as well as along the length of barrel 14. As shown, the temperature of the mixture steadily increases during the travel through the preconditioner 15, and then only slightly increases in temperature during advancement through the cooking zone. The temperature of the mixture drops at the venting zone corresponding to barrel section 32, then steadily decreases as the mixture is advanced through the forming zone represented by barrel sections 34, 36, and drops further during passage through the die holes 70. In this example, about one-half of the cooking of the mixture occurs within preconditioner 15, while the remaining cooking occurs as a result of exposure to temperatures above 140° F.–160° F. during passage through extruder 12.

EXAMPLE 1

In this test, a starting flour mixture of 99.5% by weight Semolina flour and 0.5% by weight Myvaplex 600 surfactant was prepared. This dry mixture was then fed to a Wenger TX-80 double screw extruder equipped with a preconditioner and an auger feed hopper and processed to obtain a cooked pasta product.

The TX-80 machine is of the type schematically illustrated in FIG. 1 and terminates in a double screw cone nose die head, but had a total of eight tubular heads or barrel sections.

The dry starting flour mixture (with a moisture content of 12% by weight) was fed into a preconditioner at the rate of 7.03 lbs. per minute and mixed with water introduced into the preconditioner at a rate of 0.83 lbs. per minute. The water and flour mixture in the preconditioner was raised in temperature by the injection of steam introduced at a rate of 0.40 lbs. per minute at 30 psi. Beaters in the preconditioner which may be pitched at different angles to provide a variety of possible residence times were rotated at a speed of 171 rpm and adjusted to retain the mixture in the preconditioner for 1.5 minutes. The mixture when discharged from the preconditioner had a temperature of 200° F. and a moisture content of 25% by weight.

Next, the mixture was fed into the inlet of the extruder at the entrance to the cooking zone, and tap water was introduced to the mixture at the rate of 0.97 lbs. per minute. (However, it is alternatively possible to introduce hot water of a temperature of about 180° F. in order to reduce the required mass flow rate of steam.) The screws of the extruder were rotated at a speed of 161 rpm, and no steam was introduced into the mixture during advancement through the extruder. The load of the extruder was 17.8 KW (kilowatts). The load on the extruder without the mixture present at 161 rpm is about 2.2 KW so that the increased load required by processing of the mixture therein is about 15.6 amps.

Temperatures of the twin barrels were maintained at 197° F., 195° F. and 191° F. for the third, fourth and fifth barrel section respectively. The moisture content of the flour and water mixture in the cooking zone of the extruder was about 33 percent by weight. The sixth barrel section included the vent opening which was subjected to a vacuum of 10 in. Hg. The forming zone of the extruder corresponded to seventh and eighth barrel sections, where the temperatures were 163° F. and 165° F. respectively.

Product rate through the extruder, including the total amount of water added in the preconditioner and the extruder, was 8½ lbs. per minute. The pressure at the last barrel section adjacent the die was 600 psi, and moisture of the extruded product immediately downstream of the die was 27% by weight. Total open area of the die was 0.547 square inches. The extruded products were cut by a knife to a length for elbow macaroni, and advanced to a dryer. The products in the dryer were subjected to a temperature of 130° F. for 24 minutes, and the dried, extruded products had a final moisture content of 11% by weight. The product was reconstituted in about 4 minutes and exhibited good product integrity and palatability with no appearance of darkened, burned specks.

EXAMPLE 2

A procedure was carried out substantially as in Example 1, except that water was introduced to the preconditioner at a rate of 0.71 lbs. per minute, and the screws of the preconditioner were rotated at 170 rpm. Moisture content of the mixture discharged from the preconditioner was 26.5 percent by weight.

In the extruder, steam at 125 psi was introduced at the rate of 0.66 lbs. per minute, and water was introduced into the extruder at the rate of 0.53 lbs. per minute such that the moisture content of the flour and water mixture in the cooking zone of the extruder was 37.5%. In this case, the load to the extruder was 15.98 KW, so that consequently the load required by processing of the mixture therein was about 13.78 KW.

Temperatures in the third, fourth and fifth barrel section were maintained at 203° F., 193° F. and 189° F. respectively. The sixth barrel section was communicated with a vacuum source subjecting the sixth barrel section to a vacuum of 15 in. Hg. Temperatures in the seventh and eighth barrel sections were 182° F. and 177° F. correspondingly.

Pressure in the final or eighth barrel section adjacent the die was 500 psi. The moisture of the extruded product was 27.57 percent by weight, and thus the difference in observed moisture contents of the mixture in the cooking zone and of the extruded product represented moisture removed chiefly at the venting zone, although a small amount of moisture may have been removed at the die opening 70 in the form of steam. Again, the macaroni was extremely palatable and demonstrated good product integrity after rehydration, and no darkened specks were observed.

We claim:

1. In an extruder for processing a material such as flour or the like mixed with water to form an extruded product, said extruder having an elongated barrel with a material inlet and a restricted orifice extrusion outlet adjacent opposed ends thereof, an elongated, axially rotatable, flighted extrusion screw within said barrel for moving said material from said inlet towards and through said outlet, and a vent opening through the barrel and separate from said inlet and outlet openings and located therebetween, the improvement which comprises:

structure for increasing the temperature of said material to the maximum temperature it will reach in said barrel prior to reaching said vent opening, in order to increase the vapor pressure of the water within said material;

a venting assembly operably coupled with said vent opening for removing moisture from said material and lowering the temperature thereof, said assembly including an enclosed housing secured to said barrel with the interior of the housing in communication with said vent opening;

means for creating reduced pressure conditions within said housing interior for assisting in the removal of moisture from said material; and shiftable means for preventing significant accumulation of material within said housing interior.

2. The invention of claim 1, said housing being of conical configuration with the smallest diameter end of the housing being proximal to said barrel.

3. The invention of claim 1, said means for creating reduced pressure conditions comprising a vacuum pump.

4. The invention of claim 1, said accumulation-preventing means comprising an elongated, axially rotatable screw element situated within said housing.

5. The invention of claim 4, said housing and screw element being upright.

* * * * *